(12) United States Patent
Chen et al.

(10) Patent No.: US 8,055,141 B2
(45) Date of Patent: Nov. 8, 2011

(54) BALANCED OPTICAL SIGNAL PROCESSOR

(75) Inventors: Young-Kai Chen, Berkeley Heights, NJ (US); Andreas Bertold Leven, Gillette, NJ (US); Mahmoud Rasras, Berkeley Heights, NJ (US); Kun-Yii Tu, Califon, NJ (US)

(73) Assignee: Alcatel Lucent, Paris (FR)

( * ) Notice: Subject to any disclaimer, the term of this patent is extended or adjusted under 35 U.S.C. 154(b) by 975 days.

(21) Appl. No.: 11/957,725

(22) Filed: Dec. 17, 2007

(65) Prior Publication Data

US 2009/0154940 A1      Jun. 18, 2009

(51) Int. Cl.
*H04B 10/06* (2006.01)
*H04B 10/00* (2006.01)

(52) U.S. Cl. ........ 398/212; 398/202; 398/203; 398/207; 398/211

(58) Field of Classification Search ........... 398/202–214
See application file for complete search history.

(56) References Cited

U.S. PATENT DOCUMENTS

| | | | |
|---|---|---|---|
| 4,399,563 A | 8/1983 | Greenberg | |
| 5,134,509 A * | 7/1992 | Olshansky et al. | 398/76 |
| 5,351,325 A | 9/1994 | Miller et al. | |
| 5,623,565 A | 4/1997 | Blair et al. | |
| 6,172,791 B1 | 1/2001 | Gill | |
| 6,271,959 B1 | 8/2001 | Kim et al. | |
| 6,304,369 B1 | 10/2001 | Piehler | |
| 6,501,867 B2 | 12/2002 | Gates, II | |
| 6,539,131 B1 | 3/2003 | Gill | |
| 6,694,082 B2 | 2/2004 | Hwang et al. | |
| 6,704,557 B1 | 3/2004 | Krishnamurthy | |
| 6,711,308 B2 | 3/2004 | Erben | |
| 6,819,808 B2 | 11/2004 | Erben | |
| 6,842,431 B2 | 1/2005 | Clarkson et al. | |
| 6,931,180 B2 | 8/2005 | Madsen | |
| 6,934,446 B2 | 8/2005 | Rasras | |
| 2004/0096143 A1 * | 5/2004 | Shpantzer et al. | 385/16 |
| 2004/0136634 A1 | 7/2004 | Chowdhury | |
| 2005/0041981 A1 | 2/2005 | Gill | |
| 2005/0152648 A1 | 7/2005 | Madsen | |
| 2005/0286109 A1 | 12/2005 | Gill | |
| 2005/0286825 A1 | 12/2005 | Gill | |
| 2005/0286911 A1 | 12/2005 | Doerr | |
| 2007/0047972 A1 | 3/2007 | Ikeuchi et al. | |

FOREIGN PATENT DOCUMENTS

| | | |
|---|---|---|
| EP | 0 403 991 | 12/1990 |
| EP | 1 024 378 A2 | 1/2000 |
| JP | 5091047 | 4/1993 |
| WO | WO 00/51271 | 8/2000 |

OTHER PUBLICATIONS

"Optical Hybrid Enables Next-Generation Optical Communication," Optoplex Corporation, www.optoplex.com.

(Continued)

*Primary Examiner* — Ken Vanderpuye
*Assistant Examiner* — Daniel Dobson
(74) *Attorney, Agent, or Firm* — Wall & Tong, LLP

(57) ABSTRACT

An apparatus and method for reducing electrical signal intermodulation by processing a balanced electrical signal in the optical domain in a manner adapted to reduce noise and second order intermodulation, and converting the processed optical signal back to an electrical domain signal with either a single or balanced (differential) outputs.

21 Claims, 2 Drawing Sheets

BALANCED PHOTONIC SIGNAL PROCESSOR
FOR COHERENT DETECTION

OTHER PUBLICATIONS

R. Langenhorst, G. Wenke, "Compact Bulk Optical 90 Degrees Hybrid for Balanced Phase Diversity Receivers," Electronics Letters, Oct. 26, 1989, vol. 25, No. 22, pp. 1518-1519.

R. S. Rasras et al., "Tunable Narrowband Optical Filter in CMOS," 2006 Optical Society of America.

U.S. Appl. No. 11/376,491, filed Mar. 15, 2006, Gill et al., "Method and Apparatus for Optically Filtering a Communication Signal.".

http://www.celight.com/products/index.html, CeLight, Products and Services, first page.

International Search Report, PCT/US2006/043782, Applicant: Lucent Technologies Inc., mailed Apr. 11, 2008, 3 pages.

Written Opinion of the International Searching Authority, PCT/US2006/043782, Applicant: Lucent Technologies Inc., 6 pages.

\* cited by examiner

BALANCED PHOTONIC SIGNAL PROCESSOR
FOR COHERENT DETECTION

INTEGRATED MONOLITHIC 3X4 OPTICAL COUPLER
WITH PHASE AND AMPLITUDE ADJUSTMENTS

BALANCED OPTICAL SIGNAL PROCESSOR

GOVERNMENT RIGHTS IN THIS INVENTION

This invention was made with Government support under Contract #HR0011-05-C-0027 awarded by DARPA. The Government has certain rights in this invention.

CROSS-REFERENCE TO RELATED APPLICATIONS

This application is related to commonly owned U.S. patent application Ser. No. 11/376,491, entitled "Method and Apparatus for Optically Filtering a Communication Signal", filed on Mar. 15, 2006, which is incorporated herein by reference in its entirety.

FIELD OF THE INVENTION

The present invention generally relates to signal processing systems and, more particularly, to reducing the adverse effects of noise and intermodulation in an electrical signal using optical signal processing.

BACKGROUND OF THE INVENTION

Radio Frequency (RF) and optical communications systems are subject to a variety of conditions that can degrade performance, including environmental conditions, discrepancies in design, and conditions inherent in the physical characteristics of system components. These conditions may include noise/interference from various sources (electrical or optical), intermodulation, and similar anomalies. Any real (i.e., non-ideal) amplifier will add noise to whatever signal it is amplifying, which noise may be quantified by the amplifier noise figure. Any nonlinear system may also impart intermodulation among different frequencies (channels) operating within the system. These effects become more pronounced as component characteristics change with time and/or temperature.

SUMMARY OF THE INVENTION

Various deficiencies in the prior art are addressed by an apparatus and method for reducing electrical signal intermodulation by processing a balanced electrical signal in the optical domain in a manner adapted to reduce noise and second order intermodulation, convert the processed optical signal into an electrical domain signal, and provide the signal on either a single or balanced (differential) outputs.

Specifically, an apparatus according to one embodiment of the invention comprises an optical modulator, for modulating an optical carrier signal according to a balanced electrical baseband signal to provide thereby a pair of complementary phase modulated optical signals; an optical coupler, for mixing said pair of complementary phase modulated optical signals with a photonic local oscillator signal to provide thereby first and second pairs of mixed complementary phase modulated optical signals; a first balanced detector for receiving the first mixed complementary phase modulated optical signal and providing thereby a first optical intensity difference signal; a second balanced detector for receiving the first mixed complementary phase modulated optical signal and providing thereby a second optical intensity difference signal; and a trans-impedance amplifier, for receiving each of the first and second optical intensity difference signals and providing thereby an electrical signal representative of the balance electrical baseband signal.

BRIEF DESCRIPTION OF THE FIGURES

The teachings of the present invention can be readily understood by considering the following detailed description in conjunction with the accompanying drawings, in which:

FIG. 1 depicts a high-level block diagram of a balanced photonic signal processor for.

To facilitate understanding, identical reference numerals have been used, where possible, to designate identical elements that are common to the Figures.

DETAILED DESCRIPTION

The present invention relates generally to a balanced microwave photonics signal processor (illustratively implemented via a tunable monolithically integrated platform) that is adapted to reduce optical noise and second order intermodulation for coherent optical signal detection. The invention is adapted to processing a balanced electrical signal to provide an optical signal(s), processing the optical signal(s) in a manner tending to reduce noise and second order intermodulation, and converting the processed optical signal(s) back into an electrical signal.

Figure 1:
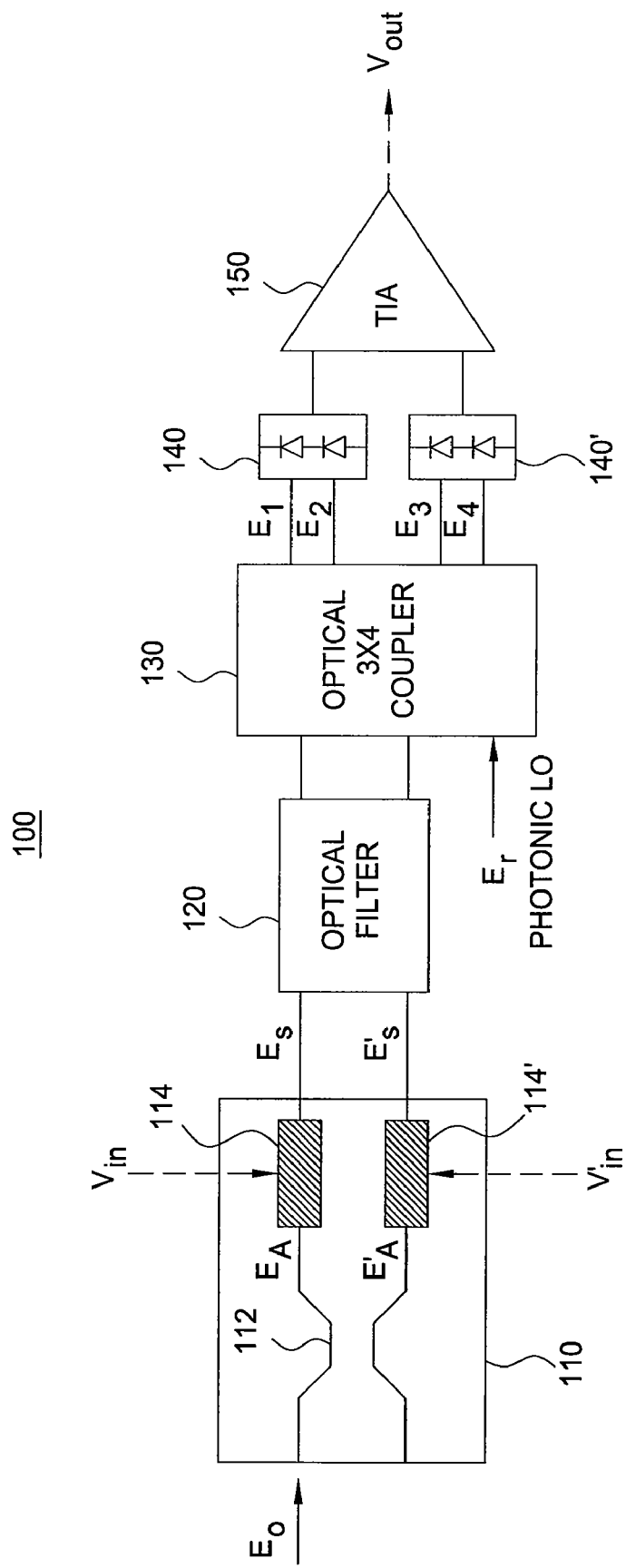

FIG. 1 depicts a high-level block diagram of a balanced photonic signal processor. Specifically, an optical modulator 110 includes an optical coupler 112 for coupling a carrier signal $E_0$ to each of first 114 and second 114' phase modulators. First phase modulator 114 modulates its portion of the optical carrier $E_0$ according to one $V_{in}$ of a pair ($V_{in}$, $V'_{in}$) of complementary baseband electrical signals. Second phase modulator 114' modulate its portion of the optical signal $E_0$ according to the other one $V'_{in}$ of the pair of complementary baseband electrical signals. The operation of the first 114 and second 114' phase modulators is characterized by, respectively, equations (1a) and (1b) below.

$$E_a = \frac{1}{\sqrt{2}}|E_o|e^{j\omega_0 t} \qquad \text{Eq. (1a)}$$

$$E'_a = \frac{j}{\sqrt{2}}|E_o|e^{j\omega_0 t} \qquad \text{Eq. (1b)}$$

That is, signals $E_a$ and $E'_a$ are passed respectively through phase modulators 114 and 114', wherein they are phase modulated by complementary baseband electrical signals $V_{in}$ and $V_{in}$, and output as complementary phase modulated optical signals $E_s$ and $E'_s$ respectively. Optical signals $E_s$ and $E'_s$ are illustratively described by, respectively, equations (2a) and (2b) below.

$$E_s = \frac{1}{\sqrt{2}}|E_o|e^{j(\omega_0 t + \phi_s)} \qquad \text{Eq. (2a)}$$

$$E'_s = \frac{j}{\sqrt{2}}|E_o|e^{j(\omega_0 t + \phi'_s)} \qquad \text{Eq. (2b)}$$

where $$\phi_s = \frac{V_{in}}{V_\pi} \text{ and } \phi'_s = \frac{V'_{in}}{V_\pi}$$

$V_\pi$ is the voltage level necessary for phase modulators 114 and 114' to produce a 'π' phase shift value.

Once output from optical modulator 110, complementary phase modulated signals $E_s$ and $E'_s$ are optionally processed by an optical filter 120. Optical filter 120 may comprise a balanced optical filter such as that described in U.S. patent application Ser. No. 11/376,491, entitled "Method and Apparatus for Optically Filtering a Communication Signal", filed on Mar. 25, 2006, and incorporated herein by reference in its entirety. Alternatively, optical filter 120 may be implemented by any optical filtering technique suitable for use in the present application.

The filtered (or unfiltered) complementary phase modulated optical signals $E_s$ and $E'_s$ are then received by first and second inputs of an optical coupler 130. In one embodiment, optical coupler 130 is a 3×4 optical coupler, having 3 inputs and 4 outputs. The third input of optical coupler 130 receives photonic local oscillator (LO) signal $E_r$. For the pair of input signals $E_s$ and $E'_s$, optical coupler produces two pairs of output signals that are mixed with $E_r$; the first pair comprising signals $E_1$ and $E_2$, and the second pair comprising signals $E_3$ and $E_4$. The signal pairs $E_1$, $E_2$, and $E_2$, $E_3$, are described illustratively by equations (3a), (3a'), and (3b), (3b').

$$E_1 = \frac{1}{2}(|E_0|e^{j(\omega_0 t + \phi_s)} + |E_r|e^{j\omega_r t}) \quad \text{Eq. (3a)}$$

$$E_2 = \frac{1}{2}(|E_0|e^{j(\omega_0 t + \phi_s)} - |E_r|e^{j\omega_r t}) \quad \text{Eq. (3a')}$$

$$E_3 = \frac{1}{2}(-|E_0|e^{j(\omega_0 t + \phi'_s)} - |E_r|e^{j\omega_r t}) \quad \text{Eq. (3b)}$$

$$E_4 = \frac{1}{2}(|E_0|e^{j(\omega_0 t + \phi'_s)} - |E_r|e^{j\omega_r t}) \quad \text{Eq. (3b')}$$

The operation of optical coupler 130, and specifically how it produces equations 3a, 3a', 3b and 3b' will be described in more detail below.

Each pair of output signals, $E_1$, $E_2$ and $E_3$, $E_4$, are coupled to respective dual inputs of a pair of balanced detectors 140 and 140', which converts the difference in magnitude between signal pairs $E_1$, $E_2$ and $E_3$, $E_4$, to corresponding electrical values $V_{12}$ (for $E_1$, $E_2$) and $V_{34}$ (for $E_3$, $E_4$). $V_{12}$ and $V_{34}$ are represented by equations 4a and 4b below.

$$V_{12} = |E_0||E_r|\cos((\omega_0 - \omega_r)t + \phi_s) \quad \text{Eq. (4-a)}$$

$$V_{34} = |E_0||E_r|\cos((\omega_0 - \omega_r)t + \phi_s) \quad \text{Eq. (4b)}$$

The output signals of balanced detectors 140 and 140' are then coupled to respective inputs of differential trans-impedance amplifier (TIA) 150. The difference between electrical values $V_{12}$ and $V_{34}$ are converted to a singular output voltage, $V_{out}$. $V_{out}$ is described illustratively by equation 5, wherein the gain of TIA 150 is represented by A.

$$V_{out} = A(V_{12} - V_{34}) = A|E_0||E_r|[\cos((\omega_r - \omega_r)t + \phi_s) - \cos((\omega_0 - \omega_r)t + \phi'_s)] \quad \text{Eq. (5)}$$

Depending upon the type of signal output desired, the invention may alternatively comprise utilizing the signals $V_{12}$ and $V_{34}$ directly (i.e. without the converting the pair to a single output $V_{out}$). Those skilled in the art and informed by the teachings of the present invention will also realize that modulator that signal processor 100 is not constrained to only processing complementary phase modulated signals, but in another embodiment of the invention, is capable of processing complementary amplitude modulated signals as well.

The operation of optical coupler 130 will now be described in more detail below, with respect to FIG. 2.

Figure 2:
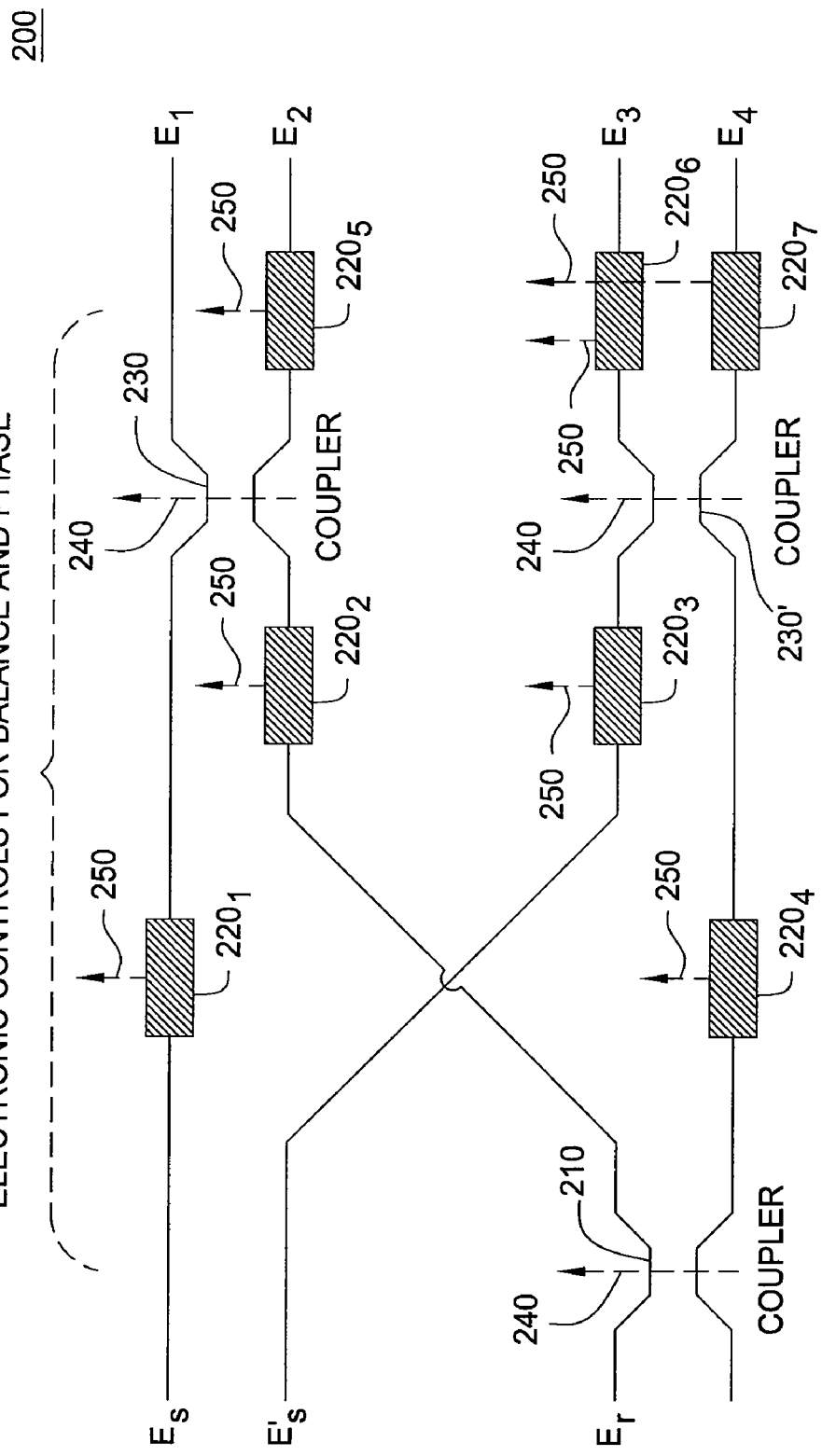
FIG. 2 depicts a high-level block diagram of a 3×4 optical coupler suitable for use within the signal processor of FIG. 1.

FIG. 2 depicts a high-level block diagram of a 3×4 optical coupler suitable for use within the signal processor of FIG. 1. Specifically, FIG. 2 depicts a tunable integrated monolithic 3×4 optical coupler 200 with phase and coupling ratio adjustments, suitable for use as the optical coupler 130, described with respect to FIG. 1. As previously detailed with respect to FIG. 1, one embodiment of optical coupler 200 has three inputs for receiving the pair of complementary phase modulated optical signals $E_s$ and $E'_s$, and optical LO signal $E_r$. Internally, optical coupler 200 comprises first and second complementary inputs for receiving the pair of signals $E_s$ and $E'_s$, and a tunable coupler 210 having an input for receiving optical local oscillator signal $E_r$ and two outputs. The first complementary input passes the signal $E_s$ to a first tunable phase shifter 220₁, and the second complementary input passes the signal $E'_s$ to a third tunable phase shifter 220₃ (description of second tunable phase shifter to follow). Tunable coupler 210 passes local oscillator signal $E_R$ via a first output leg to a second tunable phase shifter 220₂, and fourth tunable phase shifter 220₄ via a second output leg. The output signals of first and second tunable phase shifters 220₁ and 220₂ are then received by the two respective inputs of tunable coupler 230. The first output signal of tunable coupler 230 is optical signal $E_1$, as described by Eq. (3a). The second output signal of tunable coupler 230, passes through a fifth tunable phase shifter 220₅, to become optical signal $E_2$, as described by eq. (3a'). The output signals of third and fourth tunable phase shifters 220₃ and 220₄ are received by the two respective inputs of tunable coupler 230'. The first output signal of tunable coupler 230' passes through a sixth tunable phase shifter 220₆ to become signal $E_3$, as described by Eq. (3b). The second output of tunable coupler 230' passes through a seventh tunable phase shifter 220₇ to become optical signal $E_4$, as described by Eq (3b').

Signal pairs $E_1$, $E_2$, and $E_3$, $E_4$ (3a, 3a'; 3b, 3b') are provided via a selection of phase shift values for tunable phase shifters 220₁₋₇ chosen to impart optical noise reduction and second order intermodulation suppression per an embodiment of the invention. In on embodiment, the respective phase shift values for each of optical phase shifters 220₁₋₇ are shown in Table 1.

TABLE 1

| Phase Shift Values of a 3 × 4 Optical Coupler (130, 200), for Coherent Balanced RF Detection | | | | | | |
|---|---|---|---|---|---|---|
| 220₁ | 220₂ | 220₃ | 220₄ | 220₅ | 220₆ | 220₇ |
| 0 deg. | 270 deg. | 90 deg. | 0 deg. | 270 deg. | 0 deg. | 180 deg. |

According to one embodiment, optical coupler 200 comprises a 3×4 input/output arrangement in which a single pair of complementary phase modulated optical signals are processed with an optical LO signal in the manner described above with respect to FIGS. 1 (wherein optical coupler 130 is configured in a manner such as that of optical coupler 200) and 2, to produce 2 pairs of output signals. It will be appreciated by those skilled in the art and informed by the teachings of the present invention that the optical coupler 200 may receive and process multiple pairs of signals to produce additional multiple pairs of output signals. Optical coupler 200 is tunable via electronic coupling ratio control ports 240 on tunable couplers 210, 230 and 230', along with electronic phase control ports 250 on tunable phase shifters $220_{1-7}$. Therefore, it will be further understood that the invention may be adapted to function with a variety of different phase modulation techniques. For example, QPSK may be achieved by adjusting the phase shift values of tunable phase shifters $220^{1-7}$ to those listed in Table 2, and by assigning input and output ports differently, including utilizing optical coupler 200 as a 2×4 optical coupler.

TABLE 2

Phase shifts of a 2 × 4 Optical Coupler (130, 200) for QPSK detection

| $220_1$ | $220_2$ | $220_3$ | $220_4$ | $220_5$ | $220_6$ | $220_7$ |
|---|---|---|---|---|---|---|
| 0 deg. | 270 deg. | 0 deg. | 0 deg. | 270 deg. | 270 deg. | 180 deg. |

As demonstrated above, a plurality of coupler configuration options provide multiple operating modes that will be readily appreciated by those skilled in the art. For example, one embodiment of the invention may be construed as a coupler comprising a first input section for detecting first and second input signals; a second input section for detecting a local oscillator signal; and an output section for providing first, second, third, and fourth output signals; wherein the first and second input signals are mixed with the local oscillator signal in a manner such that noise and second order intermodulation are suppressed in the first, second, third, and fourth output signals; and the coupler may be further adapted to provide balanced coherent quadrature phase shift keyed (QPSK), or other types of detection.

For the embodiment in which second order intermodulation and optical noise are suppressed, the phase values of optical phase shifters $220_{1-7}$ are chosen with consideration to equations 6-8, wherein using small signal modeling convention:

$$\phi_s = \frac{V_{in}}{V_\pi} = K + a\sin(\omega_1 t) + b\sin(\omega_2 t) \quad \text{Eq. (6)}$$

where $$K = \frac{V_{dc}}{V_\pi}, \; a = \frac{v_1}{V_\pi} \; \text{and} \; b = \frac{v_2}{V_\pi},$$

In the same fashion:

$$\phi'_s = \frac{V'_{in}}{V_\pi} = K - a\sin(\omega_1 t) - b\sin(\omega_2 t) \quad \text{Eq. (7)}$$

In a small signal consideration where $v_1$ and $v_2 \ll V\pi$, the cosine functions of Eq. (5) can be expanded by treating a $\sin(\omega_1 t) + b \sin(\omega_2 t)$ as a small variable. By retaining the expansion up to $5^{th}$ order, the DC and second harmonics of the $\cos(\Phi s)$ and $\cos(\Phi' s)$ cancel due to symmetry and their coefficients being even order functions of a and b.

With respect to second order intermodulation, the terms of most significance, by definition, are $\sin[(\omega_1-\omega_2)t)]$ and $\sin[(\omega_2-\omega_1)t)]$. By contrast, the first and third order harmonics are added together due to their coefficients being odd order functions of a and b. Thus, the first order terms $\sin(\omega_1 t)$ and $\sin(\omega_2 t)$ (the wanted signals) have been added without any loss as compared to a single ended system, along with the third order harmonic signals $\sin[(2\omega_1-\omega_2)t)]$ and $\sin[(2\omega_2-\omega_1)t)]$. Therefore, little or no degradation is experienced with the third order intercept point (IP3), and in the instance of ideal balance being achieved second order inter-modulation is cancelled completely.

With further regard to second order harmonic suppression, it is known in the art that when modulation is performed by way of conventional techniques, such as through the use of a Mach-Zehnder (MZ) modulator or similar-type device, second order harmonic effects can be suppressed by adjusting DC bias. Advantageously, since various embodiments herein are directed toward a balanced design, DC bias adjustment specifically for conventional MZ modulator second order harmonics suppression is not relied upon. Accordingly, even if a modulation scheme were utilized such as implementing a pair of Electroabsorption (EA) modulators, the various embodiments would still function appropriately. As long as the modulated signal on each arm of a balanced modulator can be represented in polynomial format such that the output signal is a power series representation of the small input signal, the second order harmonics will substantially cancel by virtue of the invention being truly balanced.

With respect to optical noise reduction/cancellation, optical LO signal $E_r$ and continuous wave signal $E_0$ (of FIGS. 1 and 2), coming from a laser source, will all have embedded intensity noise, and/or Amplifier Spontaneous Emissions (ASE) if the signals are amplified. If equations 3a, 3a', 3b, and 3b' are modified such that $E_0$ becomes $E_0+n_0$ and $E_r$ becomes $E_r+n_r$, where $n_0$ and $n_r$ are the sum of the optical noises associated with $E_0$ and $E_r$ respectively, then Eq. (5) becomes:

$$V_{out}=A(V_{12}-V_{34})=A\{|E_0E||E_r|[\cos((\omega_r-\omega_0)t+\phi_s)-\cos((\omega_0-\omega_r)t+\phi's)]+|E||n_0|[\cos((\omega_r-\omega_0)t+\phi_s)-\cos((\omega_0-\chi_r)t+'s)]\} \quad \text{Eq. (8)}$$

The higher order terms in Eq. (8) produced from the beating of $n_0$ and $n_r$, and $E_0$ and $n_r$, are ignored since they are relatively small given $|E_r| \gg |E_0|$. But, the beat noise terms $E_0$ and $n_0$, and $E_r$ and $n_r$, are canceled, with the latter pair being the largest and most significant to total system noise.

For the purposes of providing "tunability" to the tunable optical phase shifters ($220_{1-7}$) and tunable optical directional couplers (210, 230 and 230'), an embodiment of the invention may include implementing the integrated optical components of the invention on a monolithic substrate such as CMOS Silicon on Insulator (SOI) or other suitable medium.

The various processes described above as apparatus functionality may also be construed as a method for balanced optical signal processing. Thus, for example, one embodiment of the invention comprises modulating an optical carrier signal according to a balanced electrical baseband signal to provide a pair of complementary phase modulated optical signals; mixing said pair of complementary phase modulated optical signals with a photonic local oscillator signal to provide thereby first and second pairs of mixed complementary phase modulated optical signals; receiving the first mixed complementary phase modulated optical signal and providing a first optical intensity difference signal; receiving the second mixed complementary phase modulated optical signal and providing a second optical intensity difference signal; and receiving each of the first and second optical intensity difference signals; and, providing an electrical signal representative of the balanced electrical baseband signal.

In another exemplary embodiment, the invention may also be construed as a method comprising modulating an optical carrier signal according to a balanced electrical baseband signal, to provide thereby a pair of complementary phase or amplitude modulated optical signals; mixing said pair of complementary phase or amplitude modulated optical signals with a photonic local oscillator signal, to provide thereby first and second pairs of mixed complementary phase or amplitude modulated optical signals; detecting the first and second pairs of mixed complementary phase or amplitude modulated optical signals and providing first and second optical intensity difference signal; and converting the first and second optical intensity difference signals into an electrical signal representative of the balanced electrical baseband signal.

Hence, while the foregoing is directed to embodiments of the present invention, other and further embodiments may be devised without departing from the basic scope thereof, which is determined by the claims that follow.

What is claimed is:

1. An optical signal processor, comprising:
    an optical modulator, for modulating an optical carrier signal according to a balanced electrical baseband signal, to provide thereby a pair of first and second complementary phase modulated optical signals;
    an optical coupler, for mixing said pair of complementary phase modulated optical signals with a photonic local oscillator signal, to provide thereby first and second pairs of mixed complementary phase modulated optical signals;
    a first balanced detector for processing the first pair of mixed complementary phase modulated optical signal, and providing thereby a first optical intensity difference signal;
    a second balanced detector for processing the second pair of mixed complementary phase modulated optical signal, and providing thereby a second optical intensity difference signal; and
    a trans-impedance amplifier, for receiving each of the first and second optical intensity difference signals, and providing thereby an electrical signal representative of the balanced electrical baseband signal.

2. The optical signal processor of claim 1, further comprising:
    an optical filter, for filtering the pair of complementary phase modulated optical signals.

3. The optical signal processor of claim 1, wherein the optical coupler comprises:
    a first optical phase shifter for processing the first of the pair complementary phase modulated optical signals, to provide thereby a first phase shifted signal;
    a first directional coupler for processing the photonic local oscillator signal, to respectively provide thereby, first and second local oscillator signal components;
    a second optical phase shifter for processing the first local oscillator signal component, to provide thereby a second phase shifted signal;
    a third optical phase shifter for processing the second of the pair of complementary phase modulated optical signal, to provide thereby a third phase shifted signal;
    a fourth optical phase shifter for processing the second local oscillator signal component, to provide thereby a fourth phase shifted signal;
    a second directional coupler for processing the first and second phase shifted signals, to respectively provide thereby a first output of the optical coupler, and a second output of the second directional coupler;
    a third directional coupler for processing the third and fourth phase shifted signals, to respectively provide thereby first and second outputs of the third directional coupler;
    a fifth optical phase shifter for processing the second output of the second directional coupler, and providing thereby a second output of the optical coupler;
    a sixth optical phase shifter for processing the first output of the third directional coupler, to provide thereby a third output of the optical coupler; and
    a seventh optical phase shifter for processing the second output of the third directional coupler, to provide thereby a fourth output of the optical coupler;
    wherein, the first and second, and third and fourth outputs of the optical coupler, respectively comprise the said first and second pairs of mixed complementary phase modulated optical signals.

4. The optical signal processor of claim 3, wherein the optical coupler is adapted to provide balanced coherent detection of radio frequency components within the pair of complementary phase modulated optical signals.

5. The optical signal processor of claim 3, wherein the first optical phase shifter provides a phase shift of 0°, the second optical phase shifter provides a phase shift of 270°, the third optical phase shifter provides a phase shift of 90°, the fourth optical phase shifter provides a phase shift of 0°, the fifth optical phase shifter provides a phase shift of 270°, the sixth optical phase shifter provides a phase shift of 0°, and the seventh optical phase shifter provides a phase shift of 180°.

6. The optical signal processor of claim 3, wherein the first, second and third directional couplers provide an even coupling ratio.

7. The optical signal processor of claim 3, wherein the first, second, third, fourth, fifth, sixth, and seventh phase shifters are tunable.

8. The optical signal processor of claim 3, wherein the first, second and third directional couplers are tunable.

9. The optical signal processor of claim 8, wherein optical coupler is adapted to provide balanced coherent quadrature phase shift keyed (QPSK) detection.

10. The optical signal processor of claim 3, wherein the first optical phase shifter provides a phase shift of 0°, the second optical phase shifter provides a phase shift of 270°, the third optical phase shifter provides a phase shift of 0°, the fourth optical phase shifter provides a phase shift of 0°, the fifth optical phase shifter provides a phase shift of 270°, the sixth optical phase shifter provides a phase shift of 270°, and the seventh optical phase shifter provides a phase shift of 180°.

11. A coupler, comprising:
    a first input section for detecting first and second input signals;
    a second input section for detecting a local oscillator signal, the second input comprises a first directional coupler for processing the local oscillator signal, to respectively provide thereby, first and second local oscillator signal components; and
    a first phase shifter for processing a first signal, to provide thereby a first phase shifted signal;
    a second phase shifter for processing the first local oscillator signal component, to provide thereby a second phase shifted signal;
    a third phase shifter for processing a second signal, to provide thereby a third phase shifted signal;

a fourth phase shifter for processing the second local oscillator signal component, to provide thereby a fourth phase shifted signal;

a second directional coupler for processing the first and second phase shifted signals, to provide thereby the first output signal via an output section, and a second output of the second directional coupler;

a third directional coupler for processing the third and fourth phase shifted signals, to provide thereby first and second outputs of the third directional coupler;

a fifth phase shifter for processing the second output of the second directional coupler, and providing thereby the second output signal via said output section;

a sixth phase shifter for processing the first output of the third directional coupler, to provide thereby the third output signal via said output section; and a seventh phase shifter for processing the second output of the third directional coupler, to provide thereby the fourth output signal via said output section;

said output section for providing first, second, third, and fourth output signals;

wherein the first and second input signals are mixed with the local oscillator signal in a manner tending to reduce noise and second order intermodulation in the first, second, third and fourth output signals.

12. The coupler of claim 11, wherein the first signal and the second signal are complementary phase modulated signals.

13. The coupler of claim 11, wherein the first signal and the second signal are complementary amplitude modulated signals.

14. The coupler of claim 11, wherein the first optical phase shifter provides a phase shift of 0°, the second optical phase shifter provides a phase shift of 270°, the third optical phase shifter provides a phase shift of 90°, the fourth optical phase shifter provides a phase shift of 0°, the fifth optical phase shifter provides a phase shift of 270°, the sixth optical phase shifter provides a phase shift of 0°, and the seventh optical phase shifter provides a phase shift of 180°.

15. The coupler of claim 11, wherein the first, second, third, and fourth directional couplers provide an even coupling ratio.

16. The coupler of claim 11, wherein the first, second, third, fourth, fifth, sixth, and seventh phase shifters are tunable.

17. The coupler of claim 11, wherein the first, second, third, and fourth directional couplers are tunable.

18. The coupler of claim 11, wherein the coupler is adapted to provide balanced coherent quadrature phase shift keyed (QPSK) detection.

19. The coupler of claim 18, wherein the first optical phase shifter provides a phase shift of 0°, the second optical phase shifter provides a phase shift of 270°, the third optical phase shifter provides a phase shift of 0°, the fourth optical phase shifter provides a phase shift of 0°, the fifth optical phase shifter provides a phase shift of 270°, the sixth optical phase shifter provides a phase shift of 270°, and the seventh optical phase shifter provides a phase shift of 180°.

20. A method, comprising:

modulating an optical carrier signal according to a balanced electrical baseband signal, to provide thereby a pair of complementary phase modulated optical signals;

mixing said pair of complementary phase modulated optical signals with a photonic local oscillator signal, to provide thereby first and second pairs of mixed complementary phase modulated optical signals;

detecting the first and second pairs of mixed complementary phase modulated optical signals and providing first and second optical intensity difference signal; and converting the first and second optical intensity difference signals into an electrical signal representative of the balanced electrical baseband signal.

21. A method, comprising:

modulating an optical carrier signal according to a balanced electrical baseband signal, to provide thereby a pair of complementary amplitude modulated optical signals;

mixing said pair of complementary amplitude modulated optical signals with a photonic local oscillator signal, to provide thereby first and second pairs of mixed complementary amplitude modulated optical signals;

detecting the first and second pairs of mixed complementary amplitude modulated optical signals and providing first and second optical intensity difference signal; and converting the first and second optical intensity difference signals into an electrical signal representative of the balanced electrical baseband signal.

* * * * *